United States Patent [19]

Ishii et al.

[11] Patent Number: 5,323,392
[45] Date of Patent: Jun. 21, 1994

[54] ADAPTATION DEVICE AND METHOD FOR EFFICIENT INTERCONNECTION OF DATA PROCESSING DEVICES AND NETWORKS

[75] Inventors: Naomitus Ishii, Yokohama, Japan; Marc Lamberton; Michel Molinengo, both of Antibes, France

[73] Assignee: International Business Machines Corporation, Armonk, N.Y.

[21] Appl. No.: 838,390

[22] Filed: Feb. 19, 1992

[30] Foreign Application Priority Data

Mar. 13, 1991 [EP] European Pat. Off. ........ 91480049.5

[51] Int. Cl.⁵ .............................................. H04J 3/22
[52] U.S. Cl. .................................... 370/79; 370/94.1; 370/110.1
[58] Field of Search ............. 370/110.1, 94.1, 79

[56] References Cited

U.S. PATENT DOCUMENTS

| | | | |
|---|---|---|---|
| 4,755,992 | 7/1988 | Albal | 370/110.1 X |
| 5,012,470 | 4/1991 | Shobu et al. | 370/110.1 |
| 5,027,343 | 6/1991 | Chan et al. | 370/13 X |

*Primary Examiner*—Douglas W. Olms
*Assistant Examiner*—Russell W. Blum
*Attorney, Agent, or Firm*—Joscelyn S. Cockburn

[57] ABSTRACT

An adaptation device (90) and method allows an efficient interconnection of data processing devices (91,92) and networks (93,94). It is based on layer 2 connectivity of entities complying with various High-level Data Link Control (HDLC) protocols, including LAPD and LAPB protocols.

7 Claims, 11 Drawing Sheets k-window for LAPD and LAPB

FIG. 1

| 7 | APPLICATION LAYER | PROVIDES A MEANS FOR APPLICATION PROCESS TO COMMUNICATE WITH ONE ANOTHER THROUGH THE OSI SYSTEM. CONTAINS MANAGEMENT FUNCTIONS TO SUPPORT DISTRIBUTED APPLICATIONS. |
|---|---|---|
| 6 | PRESENTATION LAYER | PROVIDES REPRESENTATION OF INFORMATION TO APPLICATION LAYERS IN A WAY THAT PRESERVES THE MEANING WHILE RESOLVING ANY DIFFERENCES IN FORMAT AND DATA REPRESENTATION BETWEEN THE APPLICATION SYSTEMS. |
| 5 | SESSION LAYER | PROVIDES THE MEANS NECESSARY TO COORDINATE DIALOGUE BETWEEN PRESENTATION ENTITIES. |
| 4 | TRANSPORT LAYER | PROVIDES END-TO-END CONTROL TO ALLOW FOR ERROR RECOVERY AND DETECTION TO THE HIGHER LAYERS. |
| 3 | NETWORK LAYER | ESTABLISHES, MAINTAIN, AND TERMINATES NETWORK CONNECTIONS BETWEEN END SYSTEMS. RESPONSIBLE FOR CONTROLLING THE FLOW OF DATA TO THE NETWORK. |
| 2 | LINK LAYER | PROVIDES SYNCHRONIZATION AND ERROR CONTROL FOR INFORMATION TRANSMITTED OVER THE PHYSICAL LINK. |
| 1 | PHYSICAL LAYER | PROVIDES ELECTRICAL, MECHANICAL, FUNCTIONAL, AND PROCEDURAL CHARACTERISTICS REQUIRED FOR THE PHYSICAL LINK. |

| FORMAT | COMMANDS | RESPONSES | ENCODING (LAPD) 8 7 6 5 4 3 2 1 | | | | ENCODING (LAPB) 8 7 6 5 4 3 2 1 | | | |
|---|---|---|---|---|---|---|---|---|---|---|
| INFORMATION TRANSFER (I FRAMES) | I (INFORMATION) | | N(S) | 0 | | | N(S) | 0 | | |
| | | | N(R) | P | | | N(R) | P | | |
| SUPERVISORY (S FRAMES) | RR (RECEIVE READY) | RR (RECEIVE READY) | 0 0 0 0 | P/F | 0 0 | 0 1 | 0 0 0 0 | P/F | 0 0 | 0 1 |
| | RNR (RECEIVE NOT READY) | RNR (RECEIVE NOT READY) | 0 0 0 0 | P/F | 0 1 | 0 1 | 0 0 0 0 | P/F | 0 1 | 0 1 |
| | REJ (REJECT) | REJ (REJECT) | 0 0 0 0 | P/F | 1 0 | 0 1 | 0 0 0 0 | P/F | 1 0 | 0 1 |
| UNNUMBERED (U FRAMES) | SABME (SET ASYNCHRONOUS BALANCE MODE EXTENDED) | | 0 1 1 | P | 1 1 | 1 1 | 0 0 1 | P | 1 1 | 1 1 |
| | | DM (DISCONNECT MODE) | 0 0 0 | F | 1 1 | 1 1 | 0 0 0 | F | 1 1 | 1 1 |
| | UI (UNNUMBERED INFORMATION) | | 0 0 0 | P | 0 0 | 1 1 | | | | |
| | DISC (DISCONNECT) | | 0 1 0 | P | 0 0 | 1 1 | 0 1 0 | P | 0 0 | 1 1 |
| | | UA (UNNUMBERED ACKNOWLEDGE) | 0 1 1 | F | 0 0 | 1 1 | 0 1 1 | F | 0 0 | 1 1 |
| | | FRMR (FRAME REJECT) | 1 0 0 | F | 0 1 | 1 1 | 1 0 0 | F | 0 1 | 1 1 |
| | XID (EXCHANGE IDENTIFICATION) | XID (EXCHANGE IDENTIFICATION) | 1 0 1 | P/F | 1 1 | 1 1 | | | | |

\* SABM (SET ASYNCHRONOUS BALANCE MODE) FOR LAPB

FIG. 7

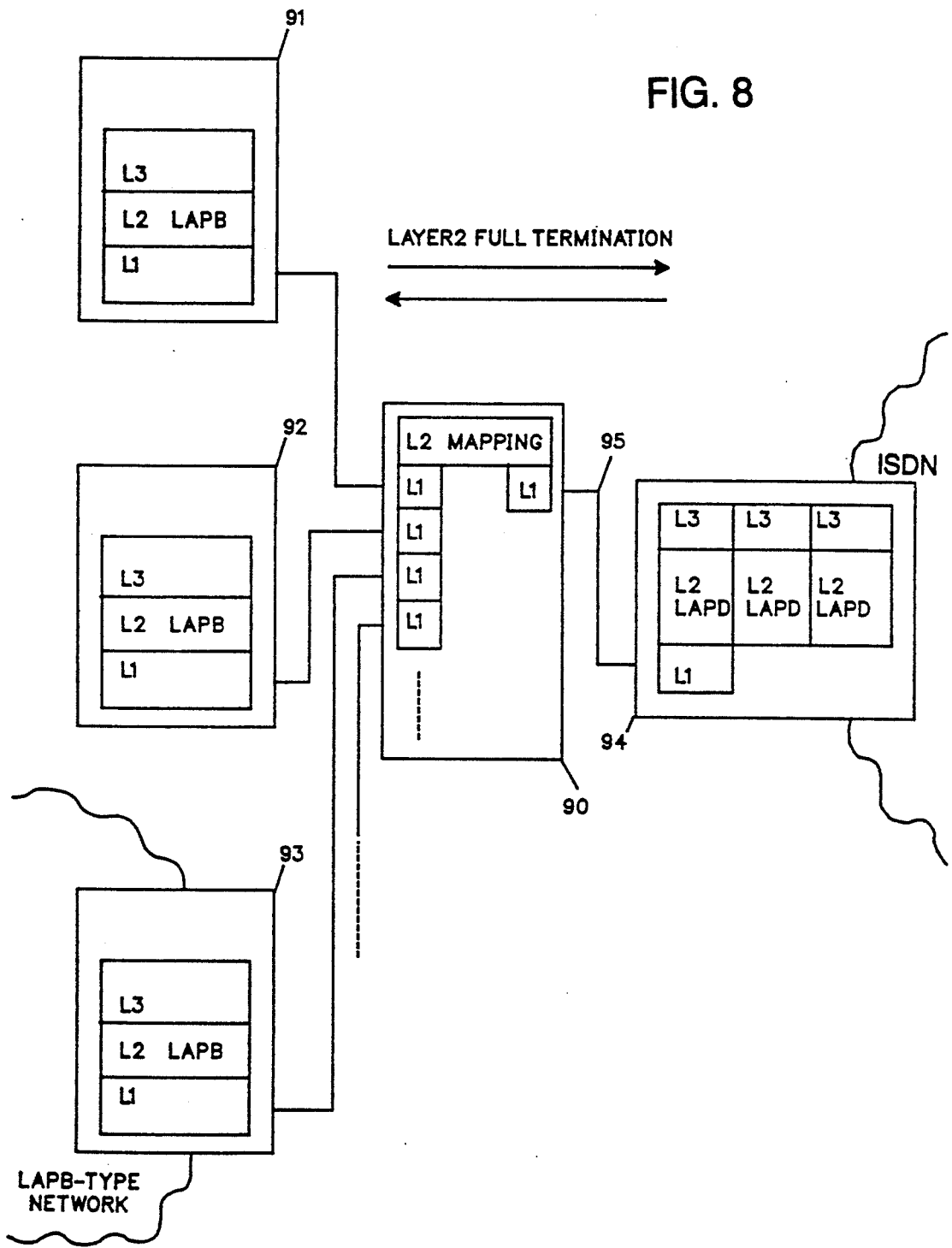

k-window for LAPD and LAPB

ADAPTATION DEVICE AND METHOD FOR EFFICIENT INTERCONNECTION OF DATA PROCESSING DEVICES AND NETWORKS

FIELD OF THE INVENTION

The present invention relates to telecommunications in general, more particularly, to adaptation device and method for efficient interconnection of data processing devices and networks, and even more particularly, to adaptation device and method based on layer 2 interconnectivity.

PRIOR ART

Nowadays, numerous types of networks coexist in the telecommunication industry, such as Local Area Networks (LANs), X.25 networks or Integrated Services Digital Networks (ISDNs),etc. . . . , with each one of them providing intraconnectivity for data processing devices attached to them.

In a worldwide effort to harmonize the mere implementation by telephone companies of these networks, as well as the development of data processing devices compatible with them, international organizations such as the Comite Consultatif International de Telegraphe et Telephone (CCITT), the European Computer Manufacturers Association (ECMA) or the International Organization for Standardization (ISO) have established standards for each one of these types of networks.

Moreover, the ISO has developed a general framework to serve as a reference for all existing and future standards, called the reference model of Open Systems Interconnection (OSI). Most existing and newly developed standards nowadays claim to be OSI compatible and fit in that general framework.

This model is a universally applicable logical structure, or layered architecture, containing seven layers as shown FIG. 1. Each layer has a set of defined functions, and receives/provides a set of services from/to the adjacent two layers. Communicating data processing devices usually feature at least the first two OSI layers. Two entities within two communicating data processing devices, but at the same OSI level are called peer entities. Communication between peer entities is established according to rules called protocols, specific to each layer and to which each entity must adhere. Protocols such as RS-232, I.430, etc . . . for layer 1, and HDLC, Q.921, etc . . . for layer 2 are examples of well-known protocols to the man skilled in the art.

When communication between a first data processing device running an application process, and a remote data processing device running another application process is needed, application data have to be encapsulated in a 'growing' frame from the application layer down to the physical layer according to the protocol at each layer (see FIG. 2), before transmittal by the first device. The remote device has to deassemble the received frame from the physical layer up to the application layer according to the protocol at each layer. Application data reach the application process run by the remote device only if at each layer, the frame passed along by the layer immediately below is recognized according to the corresponding protocol, and the frame, reduced by the amount of control information specific to that one layer, is passed along to the next above layer. Note that, at the layer 2 level, control information is specifically of the High level Data Link Control (HDLC) type, as this is the only layer 2 protocol that the present application is concerned with.

FIG. 3 shows a view closer to reality and more complete of the same type of communication, including two network termination points which actually realize the interfacing function between the network and each one of the two data processing devices. It can be seen how these network termination points handle only up to layer 3 protocols. More generally, there can be distinguished two categories of OSI layers: layers 1 to 3 are local procedure layers which allow the physical connection between the data processing device and the network interface, the data integrity for frames exchanged over that physical connection, and the establishing and maintaining of the actual communication between two devices over the network. Those are the layers that we shall be mostly concerned with in the present application. Layers 4 to 7 are end-to-end procedure layers which allow the two devices to take advantage of the established communication and exchange application data over the network.

Because there are so many coexisting different networks and standards, there is a outstanding need in the telecommunication industry, for communication between data processing devices attached to possibly heterogeneous networks. This means interconnecting of these networks, also called internetworking. It is for example easily understandable that the owner of several previously installed and existing LANs located in different buildings or locations, wants to interconnect them thru the newly installed and emerging ISDN, so that a data processing device attached to one LAN can communicate with a device attached to a remote LAN. This means to the owner, improving his data processing capability by taking advantage of the newest technology, while preserving his past investment by not having to replace the existing equipment.

Another growing need being also identified, is to be able to attach existing (and already purchased) data processing devices meant for an existing network, to a newly developed network (For example attach an X.25 Data Terminal Equipment (DTE) to the ISDN).

Such interconnections however, despite the OSI reference model commonly shared by networks and data processing devices, are not straightforward. Layer 1 for X.25 devices or networks is for example defined in recommendation X.21, while it is defined in I.430/431 for the ISDN: the physical differences are such there, that a data processing device intended for attaching to X.25 network will not be able to attach to the ISDN. At the layer 2 level, exchanged frames are very often of the HDLC generic type, a well-known protocol for the man skilled in the art, such as the Link Access Procedure on the D channel (LAPD) specific to the ISDN, or the IEEE 802.2 specific to LANs, or the Link Access Procedure Balanced (LAPB) for X.25, etc . . . These layer 2 protocols are all HDLC protocols but carry on some important differences. Differences are also found at the layer 3 level. Data processing devices and heterogeneous networks therefore need some kind of adaptation for interconnecting purpose, and this is achieved by means of adaptation devices. FIG. 4 shows some of the current interconnectivity requirements in the telecommunication industry. Adaptation devices are there found under the names of 'Terminal Adapter', 'Adapter Card', 'Network Adapter' or 'Bridge'.

A typical adaptation device known in the prior art is shown FIG. 5 between an X.25 DTE and the ISDN. Its characteristics can be found in recommendation X.31 of CCITT (Fascicule VIII.2, page 455). It is based on full termination of both link layer (layer 2) protocols in the adaptation device, that is to say the implementation in the adaptation device of a full LAPB function on the X.25 DTE side, and a full LAPD function on the ISDN side, with a relaying function synchronizing operation of the two LAPs and flow control for frames to be transferred between the DTE and the network. Of course, layer 1 functions (X.21, I.430) are also handled separately. Such a type of implementation is commonly generalized to the solution of the problem of connecting data processing devices or networks with incompatible physical and link layers (layers 1 and 2).

However, this implementation requires a very costly development effort: three full functions indeed (two LAPs and one relaying function) have to be integrated in the adaptation device. It requires besides a lot of memory hardware in the adaptation device because received frames on one side, need to be buffered until the other side is ready for transmission. Finally, all this frame buffering and independent managing of two protocols, results in a poor and inefficient connection between the data processing device and network, as data transfer is overall delayed.

SUMMARY OF THE INVENTION

It is therefore a particular object of the present invention to provide an adaptation device for efficiently interconnecting data processing devices or networks, having a layer 2 protocol of the LAPB type, and the ISDN having a layer 2 protocol of the LAPD type.

It is a further object of the present invention to provide an adaptation device for efficiently interconnecting data processing devices and network interfaces complying with various layer 2 protocols of the HDLC type.

A HDLC frame, incoming from a first data processing device or network interface complying with a first layer 2 protocol of the HDLC type, and being connected to the adaptation device, is stored within the adaptation device. Meanwhile, the adaptation device recomputes the Frame Check Sequence (FCS) so as to be able to compare it with the received FCS, and possibly discard the received frame if there is a mismatch.

Compatibility of the frame type with a second HDLC protocol is then checked: if there is no compatibility, the frame is either discarded or handled locally by the adaptation device. Otherwise, the frame is mapped onto said second HDLC protocol:

The length of the fields for parameters regarding frame sequence numbering might differ from one HDLC protocol to the other. Therefore, a method is involved, which is described below, so as to accurately map those frames parameters between the two protocols.

Address and Control Fields of the frame are then processed so as to extract information regarding the frame destination, and to be put in conformance with the second HDLC protocol.

The processed frame is then forwarded on to a second data processing device or network interface, complying with said second HDLC protocol and being connected to the adaptation device, according to the destination information.

Whereby the layer 2 protocol termination may be achieved end-to-end between the first and second data processing device or network interface, the adaptation device being 'transparent'.

The invention, for a low cost development effort (only one layer 2 mapping function in the adaptation device, little memory hardware required, . . .), allows to achieve fast and efficient communications between data processing devices or networks.

It is yet another object of the invention to provide a method for accurately mapping parameters regarding frame sequence numbering when interconnecting LAPD (modulo 128 for parameters regarding frame sequence numbering) and LAPB (modulo 8 for parameters) protocols.

It is yet a further object of the invention to provide a method for accurately mapping parameters regarding frame sequence numbering when interconnecting HDLC protocols.

If a first HDLC protocol features parameters (including send and receive parameters) regarding frame sequence numbering with a modulo larger than parameters (including send and receive parameters) in a second HDLC protocol, and that both protocols feature a HDLC window of k, the method comprises the steps of:

converting incoming parameters regarding frame sequence numbering from the first HDLC protocol, into converted parameters for the second HDLC protocol, checking that computed gaps between the values of the last incoming parameters from the second HDLC protocol, and the previously received incoming parameters from the same protocol, do not exceed the value of k, adding a gap to the value of the last incoming receive parameter from the first protocol, to obtain a converted send parameter for the first protocol, and adding a second gap to the value of the previously converted receive parameter for the first protocol, to obtain a new converted receive parameter for the first protocol.

The above introduction had to be read in conjunction with the following schematics:

FIG. 1 being a representation of the seven layers in the OSI reference model.

FIG. 2 being a simplified view of a communication over a network between two data processing devices.

FIG. 3 being a more complete view of such a communication.

FIG. 4 showing some of the current interconnectivity requirements in the telecommunication industry.

FIG. 5 showing a known adaptation device between an X.25 DTE and the ISDN.

The invention will be better understood from the following detailed description read in conjunction with the following schematics:

FIG. 6 showing a HDLC frame and the encoding for all fields but the Control Field, of LAPD and LAPB.

FIG. 7 showing the encoding for the Control Field of LAPD and LAPB.

FIG. 8 showing a preferred embodiment of the present invention.

FIG. 9 showing the mapping of LAPD to LAPB and vice-versa.

FIG. 10a, FIG. 10b and FIG. 10c showing the particular modulo conversion method which is part of the above mapping.

DETAILED DESCRIPTION OF THE PREFERRED EMBODIMENT

For description purpose, the teaching of the European Patent Application no 89480102.6 entitled 'Terminal adapter having a multiple HDLC communication channels receiver for processing control network management frames', and published on Jan. 2, 1991, will be incorporated in the present application by reference.

Figure 3:
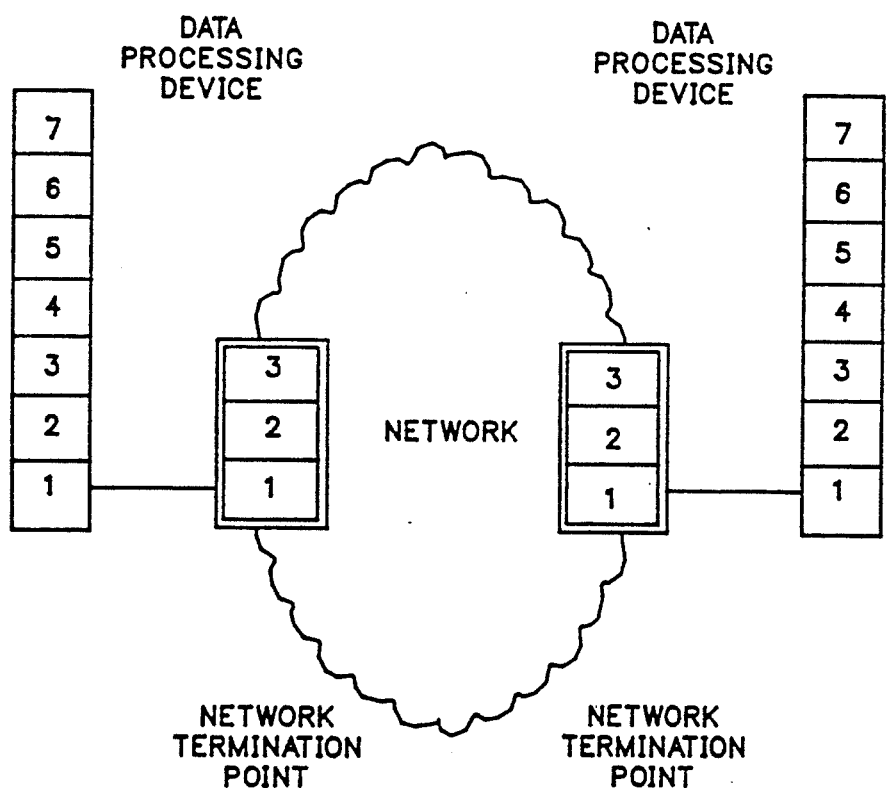
Figure 4:
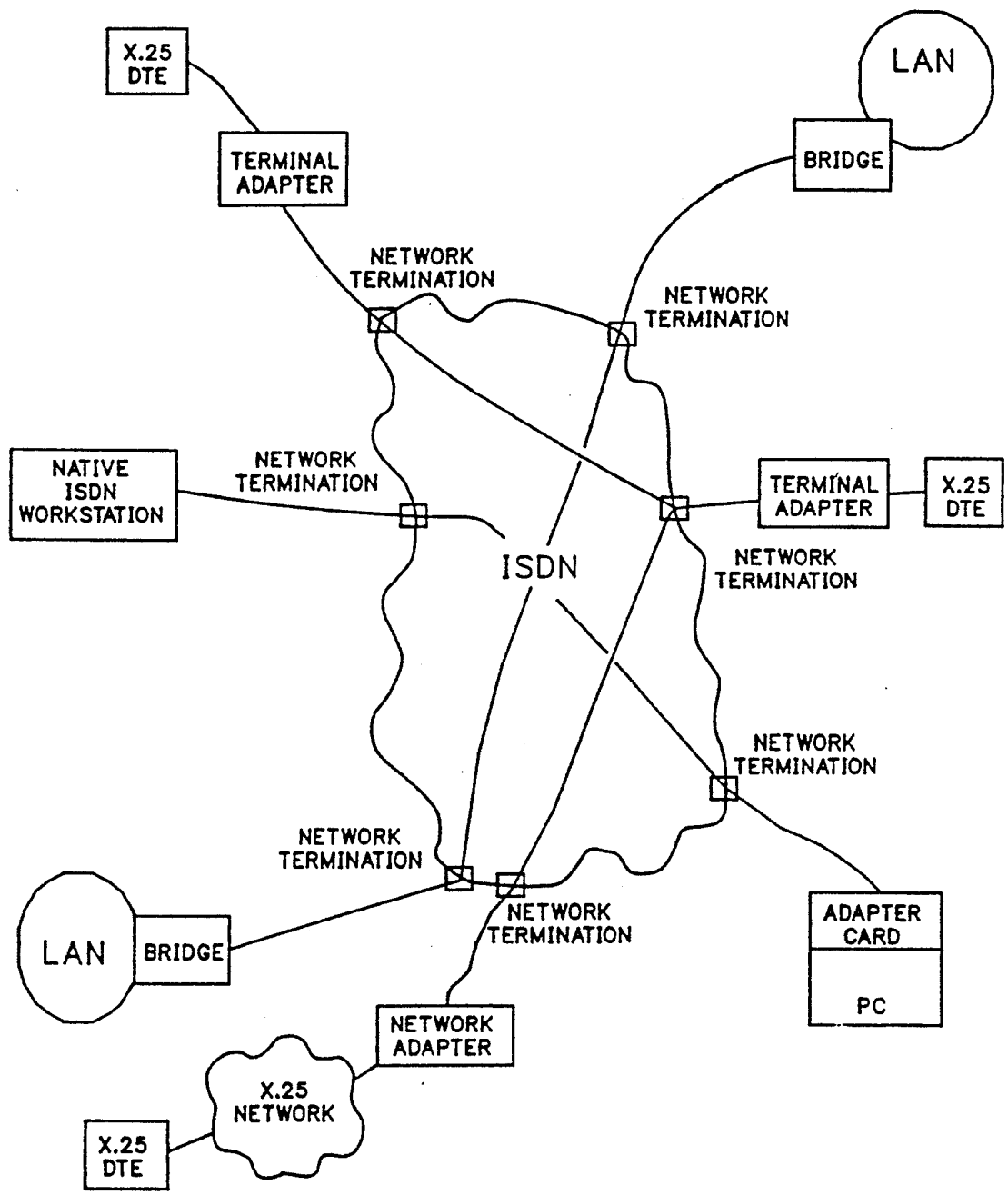
Figure 5:
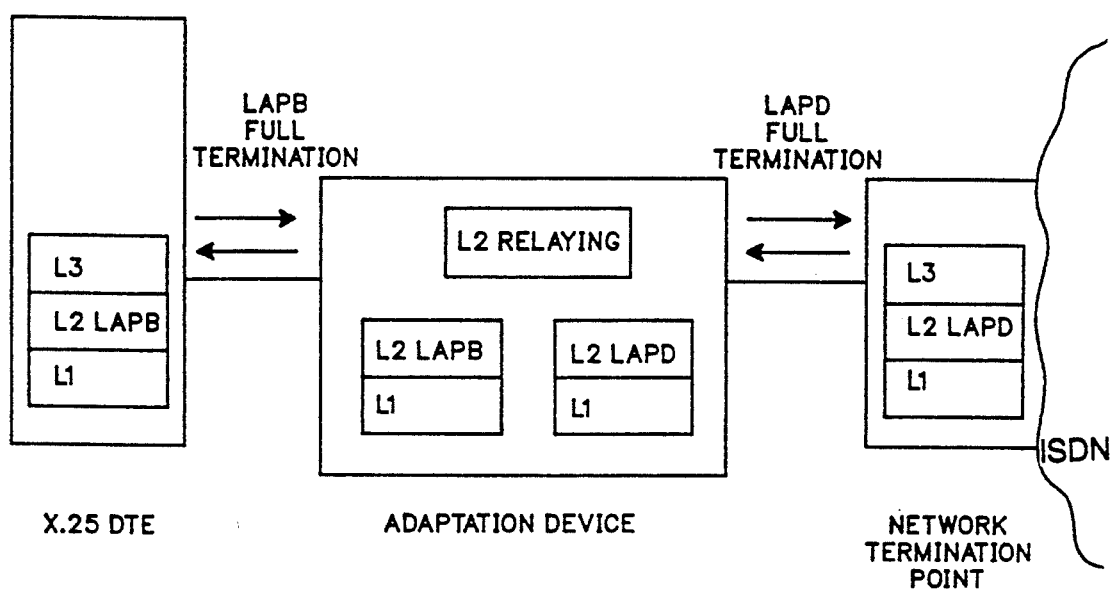

FIG. 1 of the referenced application shows a Terminal Adapter interfacing between a data processing device (TE2) and the ISDN: it comprises in particular a microprocessor (ref. app., FIG. 3c, 210) running software which resides in a PROM (ref. app., FIG. 3a, 230), and a RAM (ref. app., FIG. 3a, 220) for the microprocessor to temporary store, then retrieve information.

In numerous occasions (International Communications Association, 42nd annual conference, Dallas, Tex., USA, May 1989, IEEE symposium on ISDN for telecommunications, Waikoloa, Hi., USA, Sep. 1989, etc. . . ) were presented Terminal Adapters, including the IBM 7820, capable of handling at least one data processing device (TE2) featuring a physical layer of the V. or X. series type (V.35, X.21, etc . . .) and a link layer of the HDLC type on one side, and the ISDN S/T interface also featuring a link layer of the HDLC type (LAPD) and a Basic or Primary physical interface on the other side, so that the piece of hardware necessary in an adaptation device to:

recognize a HDLC frame incoming from a data processing device or network interface, temporary store it, possibly do some processing depending on the received frame, then forward it on to another data processing device or network interface, of the kind disclosed in the referenced application or any other kind, is considered straightforward and well-known to the man skilled in the art, at least for the maximum speeds that the present invention is concerned with (2 Mbits/sec), and will therefore not be further discussed.

Figure 6:
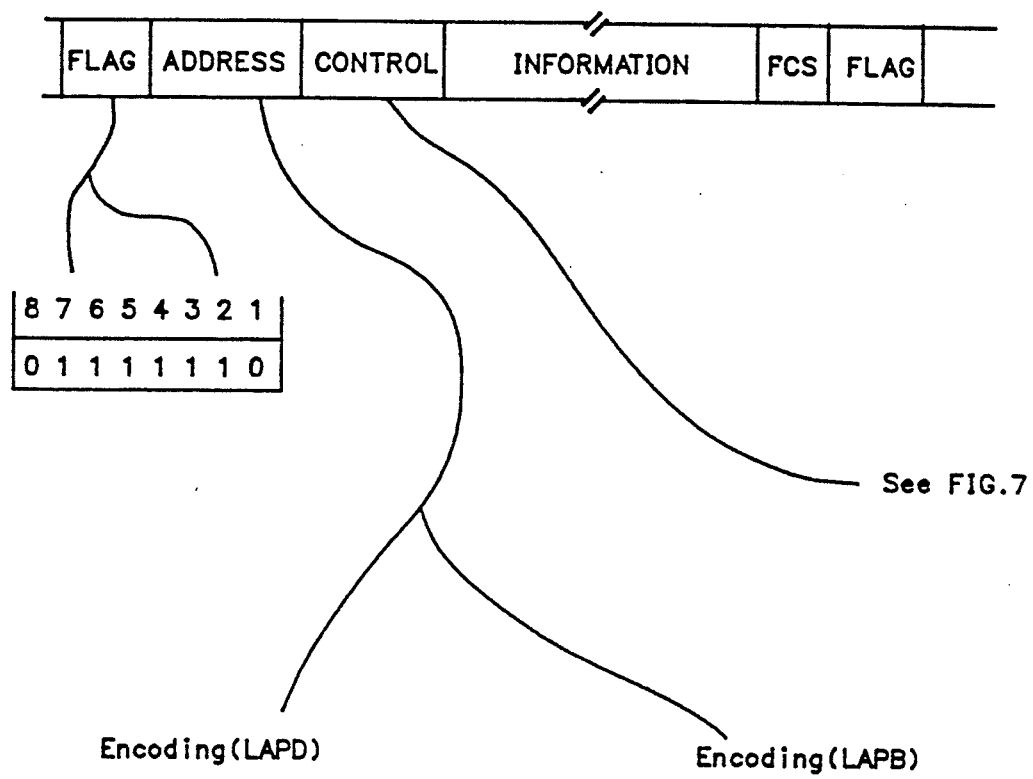

FIG. 6 recalls the format for a HDLC frame as well as encoding specific to LAPD or LAPB for all frame fields but the Control Field (further details can be found, as is well-known to the man skilled in the art, in standards and recommendations I.441, Q.921, X.25, X.75, etc. . . ). The encoding is the content for the fields, organized in one or two octets (the Information Field when present might have a different number of octets) of bits numbered 1 2 3 4 5 6 7 8.

All LAPD and LAPB frames start and end with a Flag sequence consisting of one 0 bit followed by six contiguous 1 bits and one 0 bit.

LAPD and LAPB are two-way protocols that allow the issuing by one of the two communicating entities, of a Command to which a Response must be answered. The Address Field consists then in one octet (LAPB) or two octets (LAPD) identifying the intended receiver of a Command Frame, and the transmitter of a Response Frame. C/R (Command/Response) indicates whether the frame is a Command or Response one. EA (Extended Address) indicates the final octet of the Address Field. For LAPD only, the SAPI (Service Access Point Identifier) identifies a point at which link layer services are provided by a link layer entity to a network layer entity, while the TEI (Terminal Endpoint Identifier) for a point-to-point link layer communication may be associated with a single data processing device or network interface.

Figure 2:
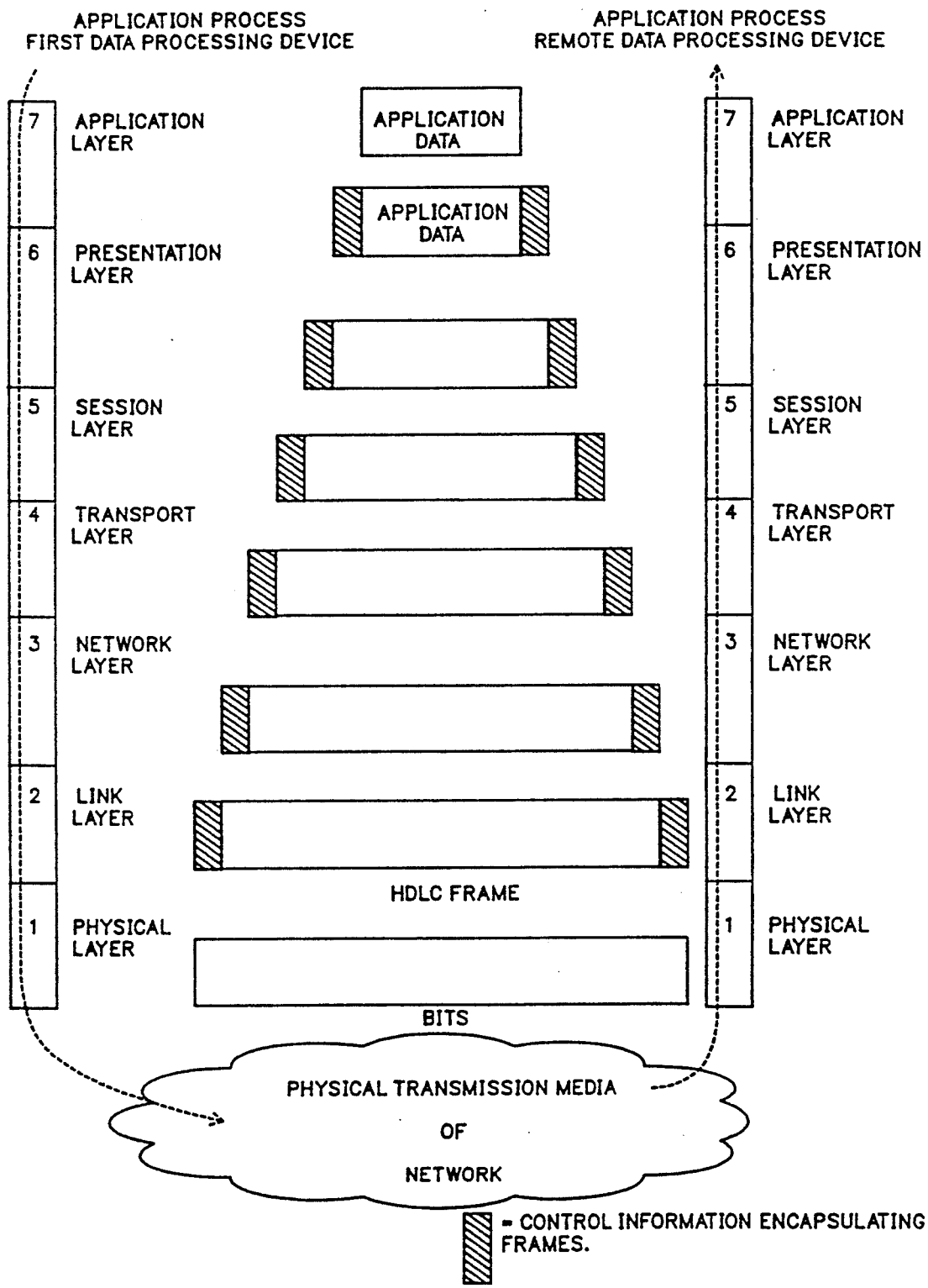

LAPD and LAPB comprise three types of frames: frames for establishing/interrupting the communication between entities (also called Unnumbered or U Frames, see below), frames for insuring the flow control when communication is established (also called Supervisory or S Frames, see below), and frames carrying the effective information exchanged by entities over the communication. Those last frames are called Information or I Frames, and include an *Information Field* of a variable number of octets. Note that some U frames may also include an Information Field (UI, FRMR and XID in the case of LAPD). Looking back at FIG. 2, it can be noticed that the content of the Information Field for I and UI frames, is the Application Data encapsulated in the control information of layer 3 and upper layers.

FCS Field is a 16-bit sequence corresponding to the remainder of a division by a given polynomial, of bits comprised in Address, Control and when present, Information Field, according to a well-known algorithm allowing for detection of bit errors that may have occurred at the physical layer level.

FIG. 7 shows the CAPD versus LAPB encoding for the Control Field of the HDLC frame (it is the 'modulo 8' type of LAPB, but as will be seen later, handling by the invention of 'modulo 128' type of LAPB can also be achieved).

Both protocols support N(S), N(R), and P/F parameters within the Control Field. N(S) is the send sequence number of the frame being transmitted by a layer 2 entity. N(R) is the expected send sequence number N(S) of the next I Frame to be received by the layer 2 peer entity (i.e. I Frames numbered up to and including N(R)−1 have been correctly received by the peer entity).

P/F is referred to as the P bit in Command Frames (F bit in Response Frames). The P bit is set to 1 when a layer 2 entity solicits (Poll) a response from its layer 2 peer entity. The F (Final) bit is set to 1 to indicate that a response is being transmitted as a result of a soliciting (Poll) command.

I Frames: LAPD Control Fields comprise 2 octets versus 1 octet for LAPB (modulo 8). P bit is identical in the two protocols, but N(S) and N(R) are encoded with 7 bits (modulo 128) in LAPD, and with 3 bits (modulo 8) in LAPB.

The same statement applies for S Frames.

As far as U Frames, it is to be noticed that UI and XID Frames in LAPD do not have an equivalent in LAPB.

FIG. 8 shows a preferred embodiment of the present invention: the adaptation device (90) efficiently interconnects at least one data processing device (91,92, . . .) or network interface (93, . . .) having a link layer of the LAPB type, with an ISDN termination point (94).

The number of data processing devices involved is typically a network limitation.

Efficiency is provided by having full end-to-end termination of the layer 2 protocols, between the ISDN termination point and each one of the data processing devices or network interfaces, the adaptation device only 'mapping' LAPD frames onto LAPB ones, and vice-versa.

It is to be noticed that the managing, by the adaptation device, of a single communication line 95 where HDLC frames incoming/outgoing from/to the various data processing devices 91, 92, . . . are multiplexed, is well-known in the state of the art (For example, Cf:

IBM 7820 in the case of up to two data processing devices).

Figure 9:
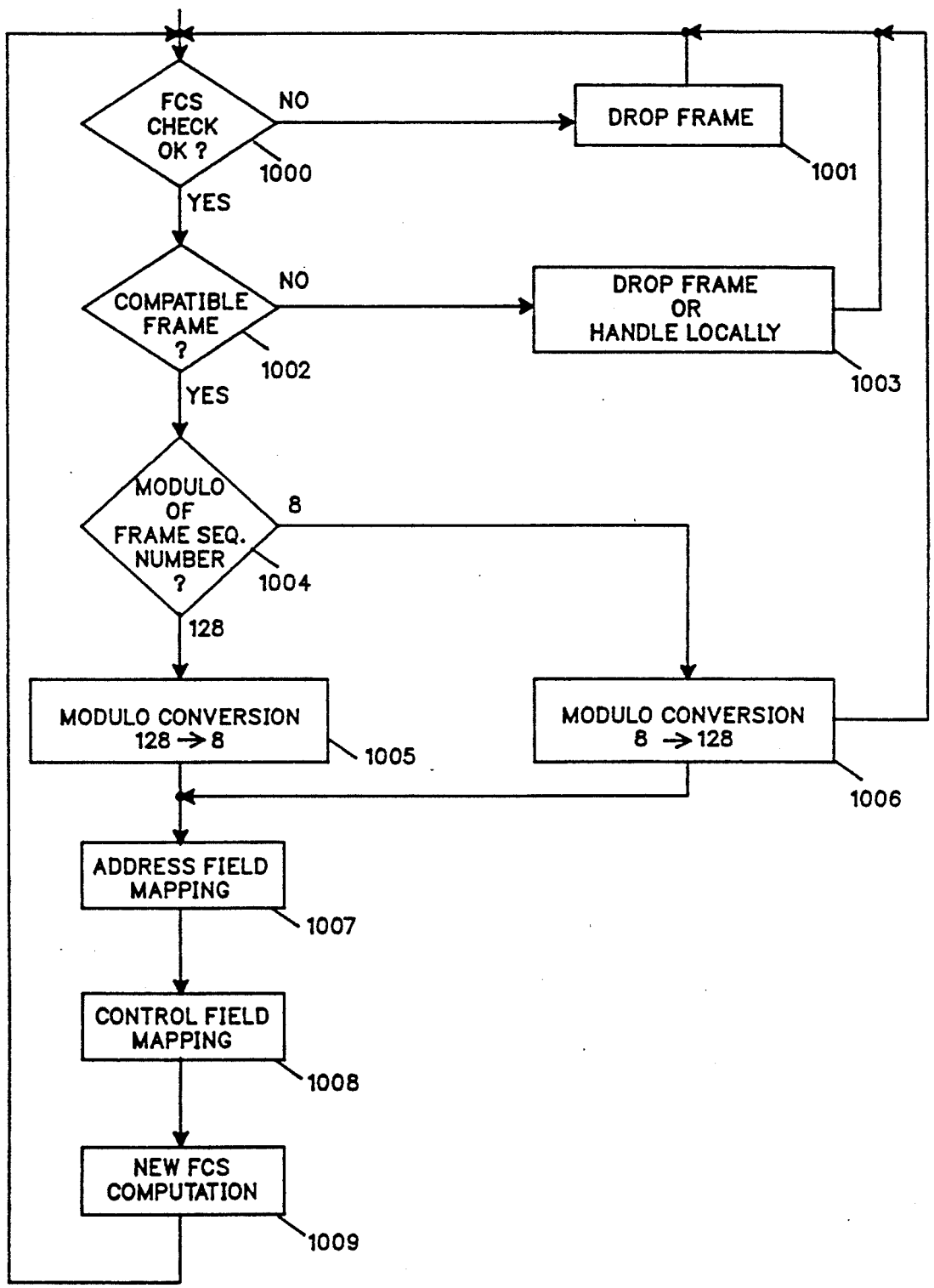

The layer 2 mapping function implemented in the adaptation device is detailed FIG. 9. It is valid for received frames of both LAPD and LAPB protocols.

It has to be reminded that in the case hardware implemented in the adaptation device would be of the type already disclosed in the previously referenced patent application, that layer 2 mapping function would be residing in the PROM, a received frame would be stored in the RAM, the processing and mapping according to FIG. 9 would be done by the microprocessor before forwarding the received frame. As said before, many other known hardware systems would also allow to perform the layer 2 mapping function, as described:

In step 1000, upon reception of an incoming frame by the adaptation device, a FCS is recalculated (on received Address, Control and when present, Information Field), and compared with the content of the received FCS Field. Any mismatch results in a dropping of the received frame (step 1001) because then data integrity has proven to be altered in the communication between the adaptation device and the ISDN termination point, or the adaptation device and the LAPB data processing devices or network interfaces. Reception of the next frame is awaited for. Otherwise, step 1002 is performed.

In step 1002, Control Field of the frame is analyzed so as to identify possible incompatible frames (i.e. frames that should not be mapped into the other protocol):

UI and XID frames received from the ISDN termination point do not have an equivalent in LAPB protocol, and are therefore dropped, or handled locally (step 1003): UI frames for example, allow the adaptation device to negotiate and obtain a TEI from the ISDN, for each one of the communicating LAPB data processing devices or network interfaces. Besides, FRMR frames are also dropped, as their handling is optional according to ISDN LAPD protocol.

FRMR frames received from anyone of the LAPB data processing devices or network interfaces are dropped too (step 1003).

In step 1004, the modulo for the parameters regarding frame sequence numbering, N(S) and N(R), is either calculated (number of bits within the Control Field) or known from given characteristics of adaptation devices, network interfaces or the ISDN.

Figure 10A:
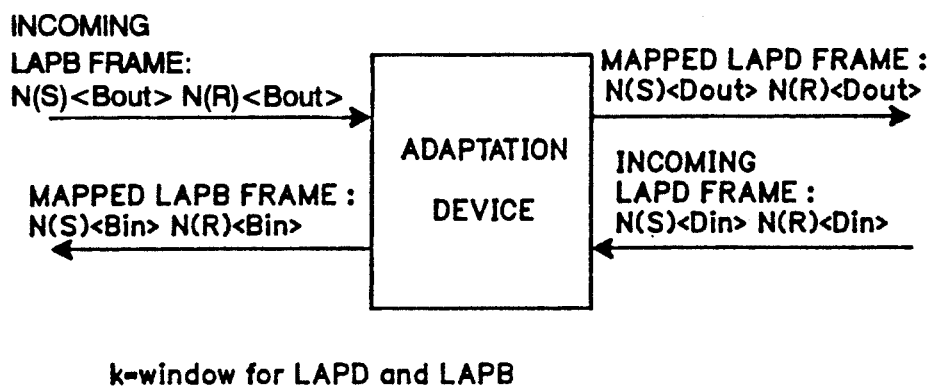
Figure 10B:
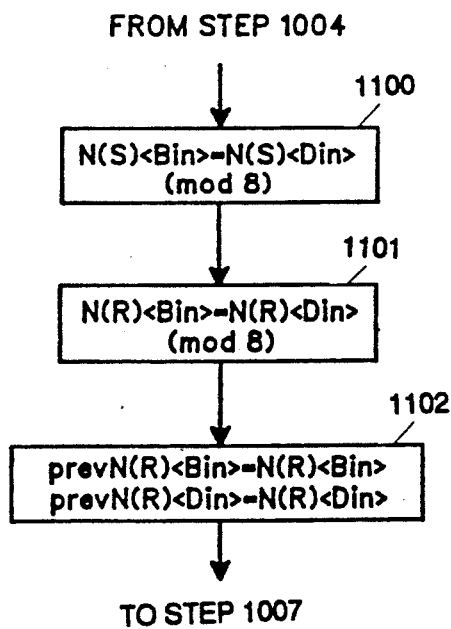

For incoming LAPD frames, 7-bit (modulo 128) parameters regarding frame sequence numbering are converted into 3-bit (modulo 8) LAPB parameters (step 1005, and FIG. 10*b*).

Figure 10C:
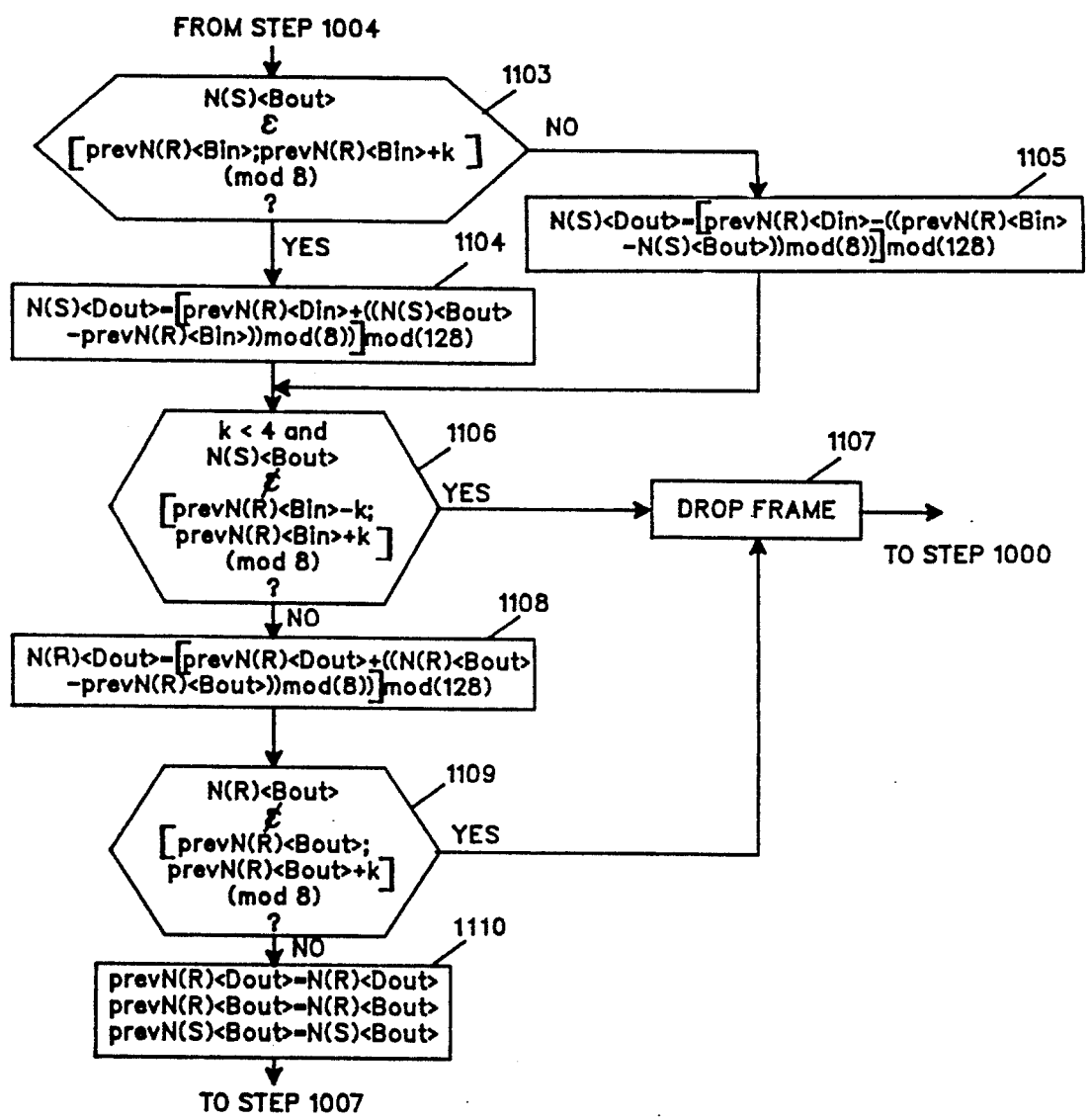

For incoming LAPB frames, 3-bit (modulo 8) parameters regarding frame sequence numbering are converted into 7-bit (modulo 128) LAPD parameters (step 1006 and FIG. 10*c*).

In step 1007, Address Fields are mapped according to the following:

In the case of a LAPD frame received from the ISDN termination point, information such as the TEI allows the adaptation device to know at which of the LAPB data processing devices or network interfaces the frame is aimed. The adaptation device modifies the Address Field so as to put it in conformance with LAPB encoding (see FIG. 6).

In the case of a LAPB frame received from anyone of the LAPB data processing devices or network interfaces, the adaptation device modifies the Address Field so as to rebuild a LAPD type frame (see FIG. 6), and includes the TEI corresponding to the originating LAPB data processing device or network interface.

In step 1008, Control Fields are mapped according to the following:

In the case of a LAPD frame received from the ISDN termination point, the two-octet Control Field is reduced to one-octet in conformance with LAPB encoding (see FIG. 7). P/F parameter is left unchanged, but N(S) and N(R) are modified according to the result of step 1005.

In the case of a LAPB frame received from anyone of the LAPB data processing devices or network interfaces, the adaptation device modifies the Control Field so as to rebuild a LAPD type frame (see FIG. 7). P/F parameter is also left unchanged, but N(S) and N(R) are modified according to the result of step 1006.

In step 1009, the received and modified frame is forwarded on to:

one of the LAPB data processing devices or network interfaces attached to the adaptation device, according to the TEI information in the LAPD frame received from the ISDN termination point.

the ISDN termination point in the case of a LAPB frame received from anyone of the LAPB data processing devices or network interfaces.

A new FCS is computed (on modified Address, Control and when present, Information Field), and sent along at the end of the forwarded HDLC frame, then the next incoming frame is awaited for.

As already mentioned, LAPB protocol might also be of the modulo 128 type. When this is the case, no conversion for the parameters in the Control Field regarding the frame sequence numbering is necessary, and steps 1004, 1005 and 1006 are skipped.

It will be obvious to the man skilled in the art that the teaching of the above description for the invention can be applied in an adaptation device handling data processing devices and network interfaces complying with communication protocols of the HDLC type other than LAPD or LAPB.

The modulo conversion method of steps 1005 and 1006 is detailed FIG. 10*a*, FIG. 10*b*, and FIG. 10*c*.

FIG. 10*a* explains the naming convention for FIG. 10*b* and FIG. 10*c*. N(S) and N(R) parameters regarding frame sequence numbering present in LAPB frames incoming into the adaptation device are named: N S)<Bout> and N(R)<Bout>, are mapped into outgoing LAPD frames and become respectively: N(S)<Dout> and N(R)<Dout>. N(S) and N(R) parameters regarding frame sequence numbering present in LAPD frames incoming into the adaptation device are named: N(S)<Din> and N(R)<Din>, are mapped into outgoing LAPB frames and become respectively: N(S)<Bin> and N(R)<Bin>.

The parameter k is the 'window' for the two LAPs. For a transmitting device, k represents the maximum number of frames comprising a N(S) parameter, that can be transmitted without receiving acknowledgement with a frame comprising a N(R) parameter from the receiving device. It should be noticed that k is a typical HDLC feature and not at all an invention's limitation. For example, if the modulo is 8, the window k=3 and N(S) parameter sent by a transmitting device is 2, three more frames can be transmitted (with N(S) equal to 3,4,5) before the receiver has to acknowledge sending back a HDLC frame including a N(R) parameter (otherwise, the communication is disturbed and the recovery from the HDLC protocol needs to be initiated).

FIG. 10b shows the modulo conversion from LAPD (modulo 128) to LAPB (modulo 8) (Cf: step 1005 of FIG. 9). N(S) and N(R) parameters for the mapped LAPB frame are simple results of a modulo 8 arithmetic operation applied on the N(S) (step 1100) and N(R) (step 1101) parameters of the incoming LAPD frame. The last N(R) parameter values for both LAPB and LAPD frames are stored (step 1102) in parameters: prevN(R)<Bin>, and prevN(R)<Din>, then a branch is made to step 1007 of FIG. 9. Some LAPD frames (Cf: FIG. 7) do not feature a N(S) parameter: therefore for these frames, step 1100 is simply skipped.

FIG. 10c shows the modulo conversion from LAPB (modulo 8) to LAPD (modulo 128) (Cf: step 1006 of FIG. 9).

In step 1110, the last N(S)<Bout> and N(R)<Bout> values are stored in prevN(S)<Bout> and prevN(R)<Bout> parameters. The last N(R)<Dout> value mapped onto a LAPD frame by the adaptation device is also stored in prevN(R)<Dout> parameter. This step is performed at the end of the processing of each incoming LAPB frame, except if an error in the parameters regarding frame sequence numbering is detected (Cf: below), in which case the corresponding frame is dropped and step 1110 is not performed.

Steps 1106 and 1109 do some checking on the value of N(S)<Bout> and N(R)<Bout> parameters present in the incoming LAPB frame. It will be obvious to the man skilled in the art, that these steps 1106 and 1109 could be performed anytime in the process of FIG. 10c, including before step 1103.

In step 1106, the value k is compared to a value which is 4 in the described embodiment, but would be half the smallest of the two modulos, if the conversion method were to be applied to protocols featuring modulos for their parameters regarding frame sequence numbering, other than 8 and 128. The last N(R) value mapped onto a LAPB frame by the adaptation device is: prevN(R)<Bin> known from step 1102. Therefore, if the value of N(S)<Bout> present in the incoming LAPB frame is not within the interval or gaps (prevN(R)<Bin>−k;prevN(R)<Bin>+k)(mod 8), the parameter regarding frame sequence numbering is in error, and the frame is dropped (step 1107).

Step 1109 checks whether the received N(R)<Bout> value present in the incoming LAPB frame is within an increment or gap k of the last N(R)<Bout> value (stored in prevN(R)<Bout> according to step 1110). If it is not, this is also a value in error, according to the definition of the window k in any HDLC protocol, and the frame is dropped (step 1107).

Steps 1103, 1104, 1105 on one hand and 1108 on the other hand, set the values for N(S)<Dout> and N(R)<Dout> parameters mapped onto the LAPD frame by the adaptation device.

The last acknowledged frame by the ISDN is the one having a parameter value regarding sequence numbering stored in prevN(R)<Din>. The last N(R)<Bin> parameter was mapped onto a LAPB frame by the adaptation device according to N(R)<Din> value, and stored in prevN(R)<Bin> (step 1102). Therefore, the parameter value N(S)<Bout> in the incoming LAPB frame should be within the (prevN(R)<Bin>;-prevN(R)<Bin>+k)(mod 8) range (step 1103).

In that case (step 1104), the N(S)<Dout> parameter mapped onto the LAPD frame by the adaptation device is worth equal to the increment between the received N(S)<Bout> and the last mapped N(R)<Bin> stored in prevN(R)<Bin>, translated (modulo 128) by the value of the last received N(R)<Din>.

If it is not within that range, that could mean a protocol error, but the frame is not dropped: it is forwarded on with a mapped N(S)<Dout> value according to step 1105. Recovery if necessary, is then performed end-to-end between the LAPD and the LAPB, and not by the adaptation device.

The last received N(R)<Bout> parameter value was stored in prevN(R)<Bout> (step 1110), while the last N(R)<Dout> value mapped onto a LAPD frame by the adaptation device, was also stored in prevN(R)<Dout> (step 1110). Therefore, the new N(R)<Dout> mapped onto a new LAPD frame, should be the previous one, incremented by the same increment as in the successive N(R)<Bout> received parameters (step 1108).

Finally, all adaptation parameters regarding frame sequence numbering, including prevN(R)<Bin>, prevN(R)<Din>, prevN(R)<Dout>, prevN(R)<Bout>, and prevN(S)<Bout>, are reset to a value of 0 whenever the data processing devices or network interfaces communicating thru the adaptation device exchange a UA and SABM(E) frame (Cf: FIG. 7).

The man skilled in the art will recognize that the above described method is easily applicable to the handling, by the adaptation device, of HDLC protocols having parameters regarding frame sequence numbering of modulos other that 8 and 128.

We claim:

1. An adaptation device for efficient interconnection of at least one first data processing device or network interface, complying with a first communication protocol of the HDLC type at the layer 2 of the OSI model, and at least one second data processing device or network interface, complying with a second communication protocol of the HDLC type, said at least one first and second data processing devices or network interfaces being connected to said adaptation device, said adaptation device comprising: storage means for storing a HDLC frame incoming from said at least one first data processing device or network interface, and means for checking the FCS Field of said HDLC frame, and discarding said frame when said checking fails, and being characterized in that the adaptation device further comprises:

means for extracting a destination information from the Address Field of said HDLC frame, means for converting within said storage means, all parameters in said Control Field and Address Field, from a first bit representation according to said first communication protocol, to a second bit representation according to said second communication protocol, means for forwarding the converted frame, including said converted Control Field and Address Field and an unchanged Information Field, from said storage means on to said at least one second data processing device or network interface, according to said destination information, and means for computing a new FCS and filling the FCS field when forwarding the converted frame.

2. The adaptation device according to claim 1, characterized in that either one of said communication protocols is a LAPD, and the other communication protocol is a LAPB.

3. An adaptation method, in an adaptation device for efficient interconnection of at least one first data processing device or network interface, complying with a first communication protocol of the HDLC type at the layer 2 of the OSI model, and at least one second data processing device or network interface, complying with a second communication protocol of the HDLC type, said at least one first and second data processing devices or network interfaces being connected to said adaptation device, and said first and second communication protocol having an identical HDLC window k, for converting first parameters regarding frame sequence numbering in the Control Field of a HDLC frame incoming from said at least one first data processing device or network interface, from a first representation according to said first communication protocol, involving a first number of bits and a first modulo for parameter values, to a second representation according to said second communication protocol, involving a second number of bits and a second modulo for parameter values, said second number of bits and modulo being smaller than said first number of bits and modulo, and for converting second parameters in a HDLC frame incoming from said at least one second data processing device or network interface, from said second representation according to said second communication protocol, involving said second number of bits and said second modulo for parameter values, to said first representation according to said first communication protocol, involving said first number of bits and said first modulo for parameter values, said adaptation method comprising the steps of:

converting received first parameters into second parameters, checking that two computed quantities between respectively the values of the last incoming second parameters and the previously received incoming N(S),N(R)(2nd modulo) do not exceed the value of k, adding a first quantity to the value of a first part of the last incoming first parameter to obtain a first part of a converted first parameter, and adding a second quantity to the value of a second part of the previously received converted first parameter to obtain a second part of a converted first parameter.

4. The adaptation method according to claim 3, characterized in that said first communication protocol is a LAPD, and said second communication protocol is a LAPB.

5. An adaptation method, in an adaptation device for efficient interconnection of at least one first data processing device or network interface, complying with a first communication protocol of the HDLC type at the layer 2 of the OSI model, and at least one second data processing device or network interface, complying with a second communication protocol of the HDLC type, said at least one first and second data processing devices or network interfaces being connected to said adaptation device, and said first and second communication protocol having an identical HDLC window k, for converting parameters regarding frame sequence numbering in the Control Field of a HDLC frame incoming from said at least one first data processing device or network interface, from a first representation according to said first communication protocol, involving a first number of bits and a first modulo for parameter values, to a second representation according to said second communication protocol, involving a second number of bits and a second modulo for parameter values, said second number of bits and modulo being smaller than said first number of bits and modulo, and said adaptation method comprising the steps of:

converting the received first parameters into second parameters by dividing at least part of first parameters by the second parameters modulo; and selecting the remainder of the division as at least part of the converted second parameters.

6. An adaptation method, in an adaptation device for efficient interconnection of at least one first data processing device or network interface, complying with a first communication protocol of the HDLC type at the layer 2 of the OSI model, and at least one second data processing device or network interface, complying with a second communication protocol of the HDLC type, said at least one first and second data processing device or network interfaces being connected to said adaptation device, and said first and second communication protocol having an identical HDLC window k, for converting first parameters regarding frame sequence numbering in the Control Field of a HDLC frame incoming from said at least one first data processing device or network interface, from a first representation according to said first communication protocol, involving a first number of bits and a first modulo for parameter values, to a second representation according to said second communication protocol, involving a second number of bits and a second modulo for parameter values, said second number of bits and modulo being smaller than said first number of bits and modulo, and for converting second parameters in a HDLC frame incoming from said at least one second data processing device or network interface, from said second representation according to said second communication protocol, involving said second number of bits and said second modulo for parameter values, to said first representation according to said first communication protocol, involving said first number of bits and said first modulo for parameter values, said adaptation method comprising the steps of:

computing a first and a second range of values which are functions of the last second parameter, the previous second parameter and k;

comparing the last second parameter to the computed first and second range of values to determine if the last second parameter is within the computed range and continuing operation in the event it is and discarding the frame if it is outside the computed range;

computing first and second values which are functions of the last second parameter and the previous second parameter; and adding the first computed value to the last incoming first parameter and the second computed value to the previous first parameter to control the converted first parameter.

7. The method set forth in claim 3 in which the first part of the converted first parameter is a send sequence number conforming to the first HDLC protocol and the second part of the converted first parameter is a receive sequence number conforming to the said first HDLC protocol.

* * * * *